United States Patent
Newport et al.

(10) Patent No.: US 11,037,456 B2
(45) Date of Patent: Jun. 15, 2021

(54) OBJECT ROTATING APPARATUS AND METHODS OF USING

(71) Applicant: AMERICAN UNIVERSITY, Washington, DC (US)

(72) Inventors: Jonathan Newport, Washington, DC (US); Arthur Shapiro, Rockville, MD (US)

(73) Assignee: AMERICAN UNIVERSITY, Washington, DC (US)

( * ) Notice: Subject to any disclaimer, the term of this patent is extended or adjusted under 35 U.S.C. 154(b) by 7 days.

(21) Appl. No.: 16/460,268

(22) Filed: Jul. 2, 2019

(65) Prior Publication Data
US 2019/0325768 A1    Oct. 24, 2019

Related U.S. Application Data

(63) Continuation of application No. 15/154,061, filed on May 13, 2016, now Pat. No. 10,380,906.

(60) Provisional application No. 62/162,130, filed on May 15, 2015.

(51) Int. Cl.
*G09B 5/06*    (2006.01)

(52) U.S. Cl.
CPC ...................... *G09B 5/06* (2013.01)

(58) Field of Classification Search
CPC ............................. G07F 17/3213; G09B 5/06
See application file for complete search history.

(56) References Cited

U.S. PATENT DOCUMENTS

| | | | | |
|---|---|---|---|---|
| 3,054,217 A | * | 9/1962 | Amato | A63F 7/382 446/236 |
| 4,300,081 A | * | 11/1981 | Van Landingham | H02P 7/2913 318/599 |
| 5,148,310 A | * | 9/1992 | Batchko | G03B 21/562 359/479 |
| 5,261,851 A | * | 11/1993 | Siebert, Jr. | A63H 1/00 446/236 |
| 6,471,606 B1 | * | 10/2002 | Simpson | A63B 69/0002 446/23 |
| 7,559,840 B1 | * | 7/2009 | D'Avanzo | G07F 17/3211 273/138.1 |
| 2002/0198068 A1 | * | 12/2002 | Jordan | A63B 69/0002 473/418 |
| 2004/0009807 A1 | * | 1/2004 | Miller | G07F 17/3267 463/20 |
| 2004/0214630 A1 | * | 10/2004 | Mayeroff | G07F 17/3244 463/20 |
| 2012/0004054 A1 | * | 1/2012 | McKendrick | A63B 69/0075 473/418 |
| 2012/0244962 A1 | * | 9/2012 | Muscarello | A63B 37/00 473/451 |
| 2014/0228157 A1 | * | 8/2014 | Johnston | A63B 24/0003 473/451 |

\* cited by examiner

*Primary Examiner* — Steve Rowland
(74) *Attorney, Agent, or Firm* — Thompson Hine LLP

(57) ABSTRACT

The present application relates to an apparatus for controllably rotating an object, such as a baseball or any sporting ball, and methods of using the apparatus for measurement of visual acuity and/or training. Specifically, in certain embodiments, an object is rotated at a selected revolutions per minute (RPM) and a subject's exposure to the rotating object is controlled by illumination and/or controlled exposure, and assessing a subject's ability to recognize the direction of rotation.

19 Claims, 1 Drawing Sheet

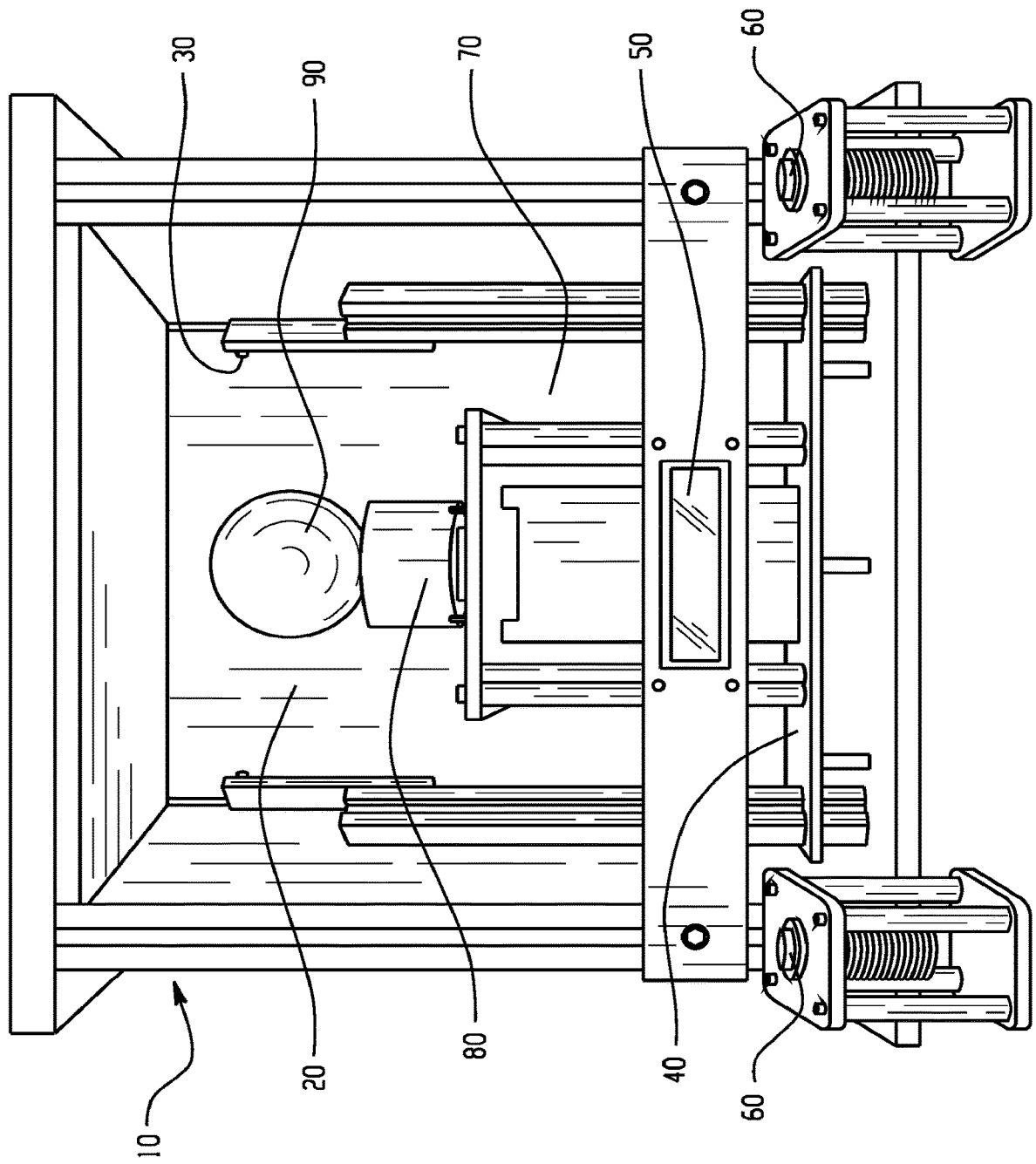

OBJECT ROTATING APPARATUS AND METHODS OF USING

This application is a continuation of application Ser. No. 15/154,061, filed May 13, 2016, which claims priority to U.S. Provisional Patent Application Ser. No. 62/162,130 filed May 15, 2015, each of which is expressly incorporated by reference herein in its entirety.

TECHNICAL FIELD

The present application relates to an apparatus for controllably rotating an object, such as a baseball or any sporting ball, and methods of using the apparatus for measurement of visual acuity and/or training. Specifically, in certain embodiments, an object is rotated at a selected revolutions per minute (RPM) and a subject's exposure to the rotating object is controlled by illumination and/or controlled exposure, and assessing a subject's ability to recognize the direction of rotation.

BACKGROUND

In many sports which involve the use of a ball, it is often important to not only be able to recognize the direction the ball is rotating, but to recognize this difference quickly. For example, in baseball, one important difference between a fastball, a curveball, a slider, and a screwball is the direction in which the ball spins. Other important factors are the speed of the pitch and rate of spin. Generally speaking, a ball thrown with a spin will curve in the same direction that the front of the ball (home plate side, when pitched) turns. If the ball is spinning from top to bottom (topspin), it will tend to nosedive into the dirt. If it's spinning from left to right, the pitch will break toward third base. The faster the rate of spin, the more the ball's path curves.

In the game of baseball, the pitcher throws a 2.9-inch-diameter ball in the direction of home plate, which is 60.5 feet away from the center of the pitcher's mound; the opponent (referred to as the batter) stands near home plate and attempts to hit the ball with a sturdy wooden bat. The pitcher makes the batter's task difficult by throwing the ball at different velocities and with different spins. One well-known type of pitch, the curveball, travels at about 75 mph with a 1500 rpm spin. The curveball is a physically measurable phenomenon: the imbalance of forces created by the ball's spin causes the ball to deviate from a straight line and to follow a smooth parabolic path. Since you only have about 0.4 seconds from when the ball leaves the pitchers hand to when it hits the catcher's mitt, it is critical to quickly recognize the rotation of the ball.

Typical major league fastballs travel at 90 mph, with a 1200 rpm backspin. Fastballs descend on their way from the pitcher's mound to home plate, but batters often report the perception that fastballs rise. There are two different types of fastballs, a two-seam and a four-seam. The two-seam fastball spins so that the two seams cross the batter's field of view on each rotation of the ball, and the four-seam fastball spins so that the four seams cross the batter's field of view on each rotation).

Similarly in soccer, for example, a goalie will need to quickly recognize the rotation of the ball in order to better position himself to block the ball from entering the goal.

Thus, there is a need for an apparatus which can replicate the spin of an object, such as a ball, under various conditions, and methods of using the apparatus to evaluate a subjects ability to detect the rotation of the object, as well as methods for training subjects to more quickly detect an object's rotation.

BRIEF DESCRIPTION OF THE DRAWINGS

FIG. 1 shows the described apparatus according to one embodiment.

DETAILED DESCRIPTION

The following detailed description will illustrate the general principles of the invention.

The disclosed apparatus and methods involve subjecting an object, such as a ball, to various rotations in a controlled and modifiable environment, and a subjects ability to recognize the rotation.

In one aspect, and referring to FIG. 1, the described apparatus comprises a rotary motion assembly comprising an object 90 attached to a shaft 80, the shaft rotatably coupled to a rotary motion actuator such that rotations of the rotary motion actuator rotate the object, and an exposure control assembly. In one embodiment, the object may be mounted on a shaft which is operably linked with a rotary motion actuator, such as a variable speed electric motor. In one embodiment, the shaft and the attached object are vertically aligned such that the object can be rotated either to the "left" based on the movement of the front of the object from right to left, where the front of the object is the portion observable by a subject, or to the "right" based in the movement of the front of the object from left to right. In alternate embodiments, the axis of rotation of the object need not be vertical but can be angled from the vertical at a degree of greater than 0 to about 90°, either to the left or the right. In addition, the point of attachment between the rotating shaft and the object can be varied. For example, a baseball can be mounted such that the rotation resembles a "two seam" rotation, a "four seam" rotation, or any other point of attachment. The speed of rotation can be controlled as well as the direction of rotation, by a controller. In one embodiment, the speed of rotation is controlled by a controller, such as a computer. The rotational speed may be fixed at a desired speed or may be changed as a function of time. For example, the ball may be rotated at speed X for a period of time A and then rotated at speed Y for a period of time B. Any combination of speeds and/or times may be used. In one embodiment, the ball is a baseball and is rotated from greater than 0 RPM to about 3000 RPM. In one embodiment, the apparatus also includes an information display 50.

As described herein, controlling viewability of the rotating object comprises an exposure control assembly which controllably illuminates the object such that it is viewable during illumination, and/or controlling the ability to see the object, such as through the use of a filter or shutter 70 disposed between the rotating object and the subject, which controls when and for how long the rotating object is viewable by the subject. In various embodiments, the exposure control assembly is controlled by a controller. In some embodiments, the illumination source may be ambient light.

In some aspects, the apparatus comprises a rotary motion assembly comprising an object 90 attached to a shaft 80, the shaft 80 rotatably coupled to a rotary motion actuator such that rotations of the rotary actuator rotate the object, an illumination source 30 that illuminates the object, an exposure control assembly, and a controller, such that the controller controls at least the rotary motion actuator and the exposure control assembly. In additional embodiments, the controller also controls the illumination source 30.

In a further aspect, the rotary motion assembly is disposed in a chamber 10. In one embodiment, the chamber comprises a top, a bottom, two side panels and a back side panel, while leaving the front, which faces the subject, open. In a further embodiment, the front is also covered with a translucent panel such as glass. In these embodiments, exposure of the rotating object to the subject is controlled by controlling illumination of the object. In an alternate embodiment, front panel of the chamber is an exposure control assembly, such as a filter or a shutter 70.

In one embodiment, the motor, which is operably linked to the shaft, is disposed underneath the bottom panel or is also disposed within the chamber 10. In various embodiments, the chamber also comprises a foreground illumination source, such as a lamp or LED. The foreground illumination source primarily illuminates the front of the ball, facing the subject. The foreground illumination source is also operably linked to the controller such that the interior of the chamber and the ball can be illuminated for a desired period of time. Further, the intensity of the illumination can be controlled. In yet a further embodiment, the chamber may also comprise a background illumination source 20, where the background illumination source can either illuminate the background behind the ball, or create patterns or images behind the ball and against the back side panel. In one embodiment, the back side panel 20 comprises a computer monitor which is able to project any desired pattern or images. In another embodiment, one or both of the side panels are background illuminated and may comprise a computer monitor. In some embodiments where multiple side and back panels are illuminated, the illumination and/or intensity on each panel may be the same or different. In one embodiment, the side panels are perpendicular to the back panel. In another embodiment, the side panels are not perpendicular to the back panel, but are at an angle of greater than 90°.

In one embodiment, an apparatus comprising a rotary motion assembly comprising an object attached to a shaft, the shaft rotatably coupled to a rotary motion actuator such that rotations of the rotary motion actuator rotate the object, and an exposure control assembly is provided. The apparatus may further comprise a controller, such that the controller controls at least the rotary motion actuator and the exposure control assembly. In one embodiment, the exposure control assembly comprises a filter or shutter which controllably allows viewing of the rotating object, the exposure control assembly controlled by the controller. The apparatus may further comprise an illumination source that illuminates the object; a chamber comprising top, bottom, rear, and side panels, the ball assembly disposed within the chamber; a foreground illumination source disposed within the chamber, the foreground illumination source in communication with the controller and controllably illuminating the object; a background illumination source, the background illumination source in communication with the controller, which controls the background illumination source, wherein the background illumination source is a monitor and the monitor is the rear panel of the chamber. In one embodiment, the object is a ball. In one embodiment, the ball is a baseball. The apparatus may further comprise a response indicator, wherein the response indicator is in communication with the controller, such that the controller compiles responses from the response indicator. In one embodiment, the rotary motion actuator is a motor selected from a stepper motor, a DC motor, or an AC motor. In one embodiment, the DC motor is a brushed DC motor or a brushless DC motor. In one embodiment, the AC motor is a synchronous AC motor. In one embodiment, the illumination source is a LED or an incandescent light. In one embodiment, the controller controls the illumination source. In one embodiment, the exposure control assembly is a filter, wherein the filter is an optical modulator. In one embodiment, the optical modulator is an electro-optic modulator selected from a single-pixel Liquid Crystal Display or a multi-pixel Liquid Crystal Display. In one embodiment, the optical modulator is an acousto-optic modulator. In one embodiment, the apparatus further comprises an audio indicator. In one embodiment, the controller controls the audio indicator. In one embodiment, the controller further comprises a rotary feedback mechanism to measure the angular speed of the motor. In one embodiment, the rotary feedback mechanism is an optical encoder. In one embodiment, the motor, motor controller and rotary feedback mechanism comprise a servomotor wherein the motor is a controlled by a motor controller that controls said motor according to said feedback mechanism. In one embodiment, the controller further comprises a microcontroller, wherein the microcontroller writes data to an SD card. In one embodiment, the apparatus further comprises a display assembly, wherein the display assembly is controlled by the controller.

In one aspect, a method for assessing a subjects ability to recognize the rotation of the object using the described apparatus is provided. In various embodiments, the subject is oriented to be facing the front side of the apparatus. The subject then observes the apparatus, and specifically, the object inside and indicates whether the object appears to be rotating to the left or the right. In various embodiments, the object is illuminated using foreground illumination for a period of time and a desired intensity level, during which the subject determines the direction of rotation. In one embodiment, the object is illuminated using foreground illumination for a period from about 100 ms to about 2000 ms. In various embodiments, as described above, background illumination may also be employed and varied during the assessment process. The distance between the subject and the apparatus can be varied. In some embodiments, the subject's ability to view the rotating object is controlled by the exposure control assembly. In some embodiments, the subject's ability to view the rotating object is controlled by both the illumination source(s) and the exposure control assembly.

Also, the relationship between the apparatus and the subject can be varied, such that the subject may be positioned directly in front of the apparatus or at a position which is not directly in front of the apparatus. In one embodiment, the subject views the rotating ball with the fovea, or a "head on" view, while in other embodiments, the subject views the rotating ball with peripheral vision.

In one aspect, a method for training a subject to more quickly recognize the rotation of a ball using the described apparatus is also provided. In general, the method of training the subject comprises the method for assessing the subject, but with repetitions of the assessing method. For example, initially, the subject will be required to determine spin direction using a slower rotation and/or a longer and/or brighter illumination period. In subsequent training, the rotation speed is increased and/or the illumination time is decreased and/or the illumination intensity is decreased. In various embodiments, as described above, background illumination may also be employed and varied during the training process.

In various embodiments of the described methods, the subject may indicate the direction of rotation by a response indicator 60. In various embodiments, the response indicator 60 includes buttons, switches, capacitive touch sensors or verbal indications picked up by a microphone. In one embodiment, the subject responds by selecting or pressing the appropriate button on a hand held response indicator 60. The response indicator 60, such as the hand held response indicator, can also be coupled to a computer to record and track the subjects responses. In one embodiment, the computer is also the apparatus controller such that the apparatus parameters are also recorded with the subject's responses. Further, the computer can calculate and plot the subject's response in relation to any or all of the apparatus parameters described above.

The embodiments of this invention described above are exemplary of numerous embodiments that may be made within the scope of the appended claims.

What is claimed is:

1. An apparatus comprising
a rotary motion assembly comprising an object attached to a shaft, the shaft rotatably coupled to a rotary motion actuator such that rotations of the rotary motion actuator rotate the object,
an exposure control assembly comprising a filter which controllably allows viewing of the rotating object, wherein the filter is an electro-optic modulator,
an illumination source that illuminates the object, and
a controller, such that the controller controls at least the rotary motion actuator and the exposure control assembly, wherein the controller further comprises a rotary feedback mechanism to measure the angular speed of the motor.

2. The apparatus of claim 1, further comprising a chamber comprising top, bottom, rear, and side panels, the rotary motion assembly disposed within the chamber.

3. The apparatus of claim 2, further comprising a foreground illumination source disposed within the chamber, the foreground illumination source in communication with the controller and controllably illuminating the object.

4. The apparatus of claim 2, further comprising a background illumination source, the background illumination source in communication with the controller, which controls the background illumination source.

5. The apparatus of claim 4 wherein the background illumination source is a monitor and the monitor is the rear panel of the chamber.

6. The apparatus of claim 1 wherein the object is a ball.

7. The apparatus of claim 6 wherein the ball is a baseball.

8. The apparatus of claim 1 further comprising a response indicator.

9. The apparatus of claim 8 wherein the response indicator is in communication with the controller, such that the controller compiles responses from the response indicator.

10. The apparatus of claim 1 wherein the rotary motion actuator is a motor selected from a stepper motor, a DC motor, or an AC motor.

11. The apparatus of claim 1 wherein the illumination source is a LED or an incandescent light.

12. The apparatus of claim 1 wherein the controller controls the illumination source.

13. The apparatus of claim 1 wherein the electro-optic modulator is selected from a single-pixel Liquid Crystal Display or a multi-pixel Liquid Crystal Display.

14. The apparatus of claim 1 further comprising an audio indicator.

15. The apparatus of claim 14 wherein the controller controls the audio indicator.

16. The apparatus of claim 1 wherein the rotary feedback mechanism is an optical encoder.

17. The apparatus of claim 1 wherein the motor, controller and rotary feedback mechanism comprise a servomotor wherein the motor is controlled by controller that controls said motor according to said rotary feedback mechanism.

18. The apparatus of claim 1 wherein the controller further comprises a microcontroller, wherein the microcontroller writes data to an SD card.

19. The apparatus of claim 1 further comprising a display assembly, wherein the display assembly is controlled by the controller.

* * * * *